United States Patent
Lee et al.

(10) Patent No.: US 10,805,631 B2
(45) Date of Patent: Oct. 13, 2020

(54) METHOD AND APPARATUS FOR PERFORMING PREDICTION USING TEMPLATE-BASED WEIGHT

(71) Applicant: LG ELECTRONICS INC., Seoul (KR)

(72) Inventors: Jaeho Lee, Seoul (KR); Junghak Nam, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/335,116

(22) PCT Filed: Sep. 22, 2017

(86) PCT No.: PCT/KR2017/010503
§ 371 (c)(1),
(2) Date: Mar. 20, 2019

(87) PCT Pub. No.: WO2018/056763
PCT Pub. Date: Mar. 29, 2018

(65) Prior Publication Data
US 2019/0215531 A1    Jul. 11, 2019

Related U.S. Application Data

(60) Provisional application No. 62/398,523, filed on Sep. 23, 2016.

(51) Int. Cl.
H04N 19/577 (2014.01)
*H04N 19/122* (2014.01)
*H04N 19/176* (2014.01)
*H04N 19/96* (2014.01)
*H04N 19/567* (2014.01)
*H04N 19/70* (2014.01)
*H04N 19/192* (2014.01)
(Continued)

(52) U.S. Cl.
CPC ......... *H04N 19/577* (2014.11); *H04N 19/109* (2014.11); *H04N 19/11* (2014.11);
(Continued)

(58) Field of Classification Search
CPC .. H04N 19/577; H04N 19/122; H04N 19/567; H04N 19/96; H04N 19/176
(Continued)

(56) References Cited

U.S. PATENT DOCUMENTS

2006/0198440 A1* 9/2006 Yin ...................... H04N 19/105
375/240.12
2011/0002388 A1* 1/2011 Karczewicz .......... H04N 19/51
375/240.15
(Continued)

FOREIGN PATENT DOCUMENTS

KR    10-2009-0060637 A    6/2009
KR    10-2013-0023444 A    3/2013
(Continued)

*Primary Examiner* — Zaihan Jiang
(74) *Attorney, Agent, or Firm* — Dentons US LLP

(57) ABSTRACT

The present invention relates to a method for performing bi-prediction using a template-based weight, comprising the steps of: determining a template region for performing bi-prediction of a current block; calculating an uncorrelation factor on the basis of the template region, wherein the uncorrelation factor denotes a value indicating the uncorrelation between a template of the current block and a template of a reference block; determining a first weight parameter of the current block on the basis of the uncorrelation factor; and obtaining a first prediction value of the current block using the weight parameter.

12 Claims, 11 Drawing Sheets

$P[x]=(1-w)*P_0[x+v_0]+w*P_1[x+v_1], \forall x$ in current block

(51) Int. Cl.
*H04N 19/109* (2014.01)
*H04N 19/11* (2014.01)
*H04N 19/136* (2014.01)

(52) U.S. Cl.
CPC ......... *H04N 19/122* (2014.11); *H04N 19/136* (2014.11); *H04N 19/176* (2014.11); *H04N 19/192* (2014.11); *H04N 19/567* (2014.11); *H04N 19/70* (2014.11); *H04N 19/96* (2014.11)

(58) Field of Classification Search
USPC .................................................... 375/240.16
See application file for complete search history.

(56) References Cited

U.S. PATENT DOCUMENTS

| | | | | |
|---|---|---|---|---|
| 2011/0007803 A1* | 1/2011 | Karczewicz | ......... | H04N 19/105 |
| | | | | 375/240.15 |
| 2011/0019731 A1* | 1/2011 | Boyce | ................. | H04N 19/176 |
| | | | | 375/240.02 |
| 2011/0109721 A1* | 5/2011 | Hong | .................... | H04N 19/597 |
| | | | | 348/43 |
| 2013/0034149 A1* | 2/2013 | Karuchula | ............. | H04N 19/61 |
| | | | | 375/240.03 |
| 2014/0105299 A1* | 4/2014 | Chen | .................... | H04N 19/597 |
| | | | | 375/240.15 |
| 2016/0050428 A1* | 2/2016 | Tanizawa | ............... | H04N 19/51 |
| | | | | 375/240.16 |
| 2016/0360210 A1* | 12/2016 | Xiu | ....................... | H04N 19/176 |
| 2017/0374366 A1* | 12/2017 | Xiu | ....................... | H04N 19/129 |
| 2019/0045183 A1* | 2/2019 | Chen | ...................... | H04N 19/117 |
| 2019/0246133 A1* | 8/2019 | Lee | ....................... | H04N 19/105 |
| 2019/0313113 A1* | 10/2019 | Lee | ....................... | H04N 19/176 |

FOREIGN PATENT DOCUMENTS

| | | |
|---|---|---|
| KR | 10-2015-0003249 A | 1/2015 |
| KR | 10-1624058 B1 | 5/2016 |
| KR | 10-1632126 B1 | 6/2016 |

* cited by examiner

FIG. 3
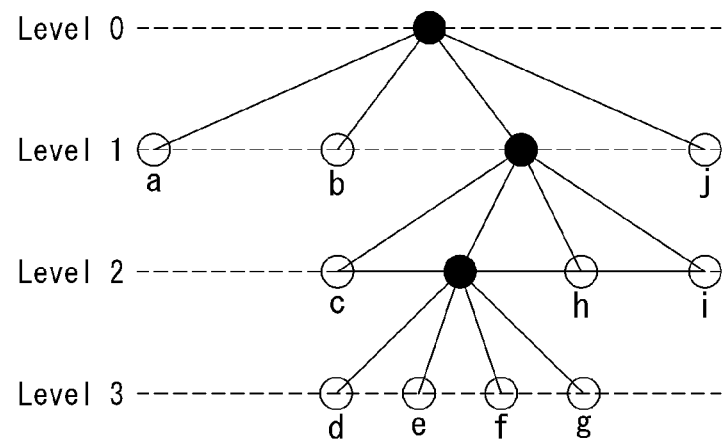
(a)
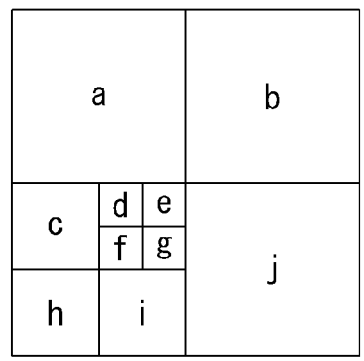
(b)

FIG. 4
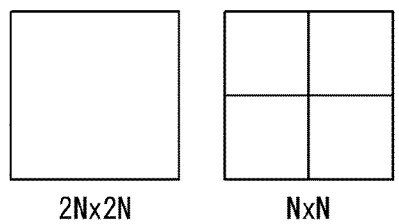
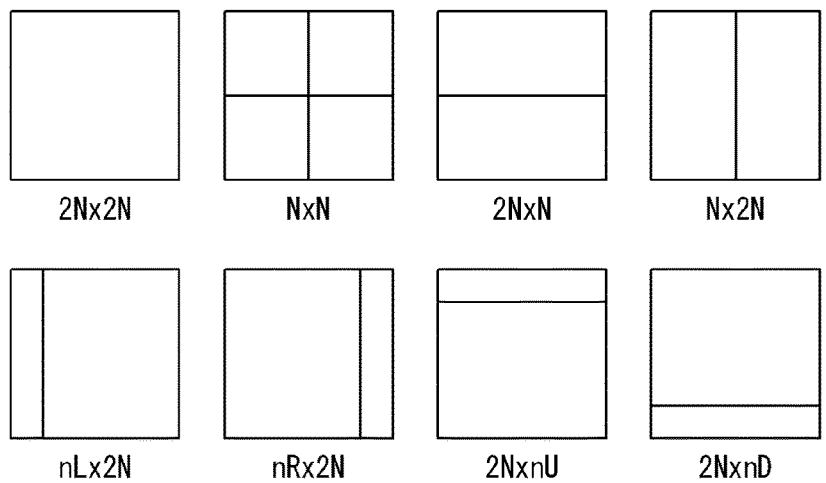
FIG. 5
QTBT
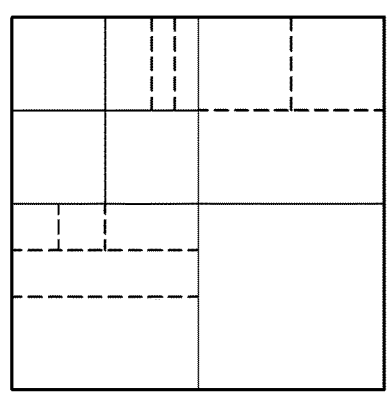
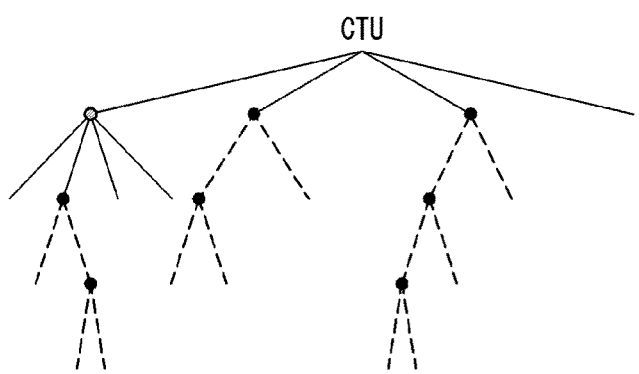
——— Quadtree split
----- Binarytree split

FIG. 10

| prediction_unit( x0, y0, nPbW, nPbH ) { | Descriptor |
|---|---|
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) { | |
|         inter_pred_idc[ x0 ][ y0 ] | ae(v) |
|         if( inter_pred_idc[ x0 ][ y0 ] == PRED_BI ) { | |
|           gbi_idx[ x0 ][ y0 ] | ae(v) |
|         } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && <br>          inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

S1010 → if( inter_pred_idc[ x0 ][ y0 ] == PRED_BI ) {
S1020 → gbi_idx[ x0 ][ y0 ]

METHOD AND APPARATUS FOR PERFORMING PREDICTION USING TEMPLATE-BASED WEIGHT

CROSS-REFERENCE TO RELATED APPLICATIONS

This application is the National Stage filing under 35 U.S.C. 371 of International Application No. PCT/KR2017/010503, filed on Sep. 22, 2017, which claims the benefit of U.S. Provisional Applications No. 62/398,523, filed on Sep. 23, 2016, the contents of which are all hereby incorporated by reference herein in their entirety.

TECHNICAL FIELD

The present invention relates to a method and apparatus for encoding/decoding a video signal and, more particularly, to a method and apparatus for determining an optimal prediction weight using a template and performing inter prediction.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

DISCLOSURE

Technical Problem

The present invention is to propose a method of encoding, decoding a video signal more efficiently.

Furthermore, the present invention is to propose a method of determining an optimal prediction method among various prediction methods.

Furthermore, the present invention is to propose a method of explicitly transmitting a weight index.

Furthermore, the present invention is to propose a method of determining a template region.

Furthermore, the present invention is to propose a method of determining an uncorrelation factor based on a template region.

Furthermore, the present invention is to propose a method of obtaining an optimal predictor using an adaptive weight parameter in a generalized bi-prediction.

Technical Solution

In order to accomplish the objects,
the present invention provides a method of determining an optimal prediction weight using a template.

Furthermore, the present invention provides a method of obtaining an optimal predictor using an adaptive weight parameter in a generalized bi-prediction.

Furthermore, the present invention provides a method of obtaining an optimal predictor by explicitly transmitting a weight index.

Furthermore, the present invention provides a method of determining a template region based on neighboring pixels of an L0 reference block, an L1 reference block and a current block.

Furthermore, the present invention provides a method of determining an uncorrelation factor indicating an uncorrelation between an L0 reference block and a current block and an uncorrelation between an L1 reference block and the current block based on the template of the L0 reference block, the L1 reference block and the current block.

Furthermore, the present invention a method of adaptively determining a weight parameter using an uncorrelation factor.

Advantageous Effects

The present invention can obtain a further improved predictor using an adaptive weight parameter in a generalized bi-prediction.

Furthermore, the present invention can obtain a further improved predictor and improve encoding efficiency of an image by adaptively determining a weight parameter for an L0 predictor and an L1 predictor.

DESCRIPTION OF DRAWINGS

FIG. 3 is a diagram illustrating a split structure of a coding unit according to an embodiment of the present invention.

FIG. 4 is an embodiment to which the present invention is applied and is a diagram for illustrating a prediction unit.

FIG. 5 is an embodiment to which the present invention is applied and is a diagram for illustrating a quadtree binarytree (hereinafter referred to as a "QTBT") block split structure.

FIG. 10 is an embodiment to which the present invention is applied and shows a syntax structure in which an optimal bi-directional prediction is performed using a weight index.

BEST MODE

Figure 1:
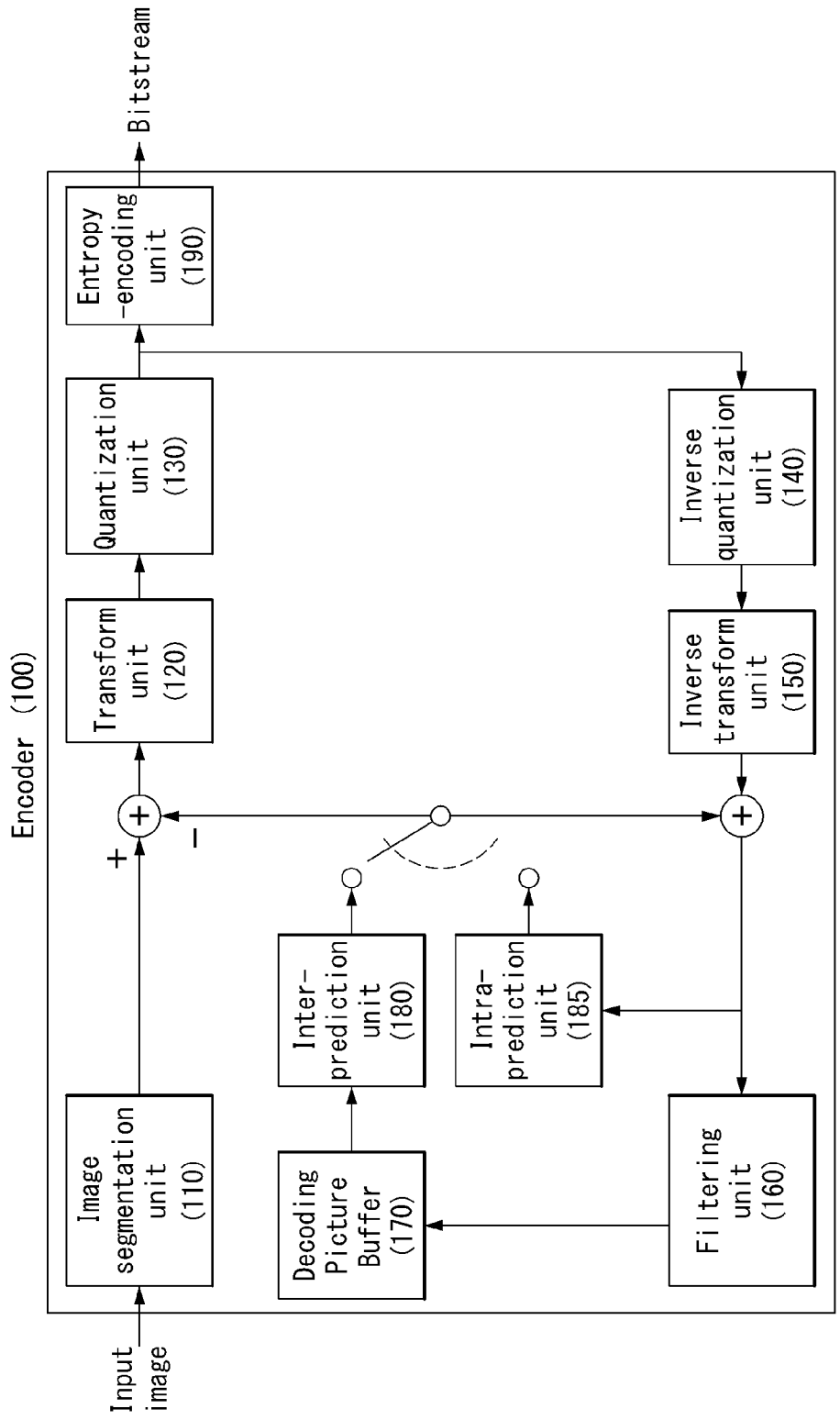
FIG. 1 is a block diagram illustrating a configuration of an encoder for encoding a video signal according to an embodiment of the present invention.

The present invention provides a method of performing a bi-directional prediction using a template-based weight, including determining a template region for performing the bi-directional prediction on a current block; calculating an uncorrelation factor based on the template region, wherein the uncorrelation factor means a value indicating an uncorrelation between a template of the current block and a template of a reference block; determining a $1^{st}$ weight parameter of the current block based on the uncorrelation factor; and obtaining a first predictor of the current block using the weight parameter.

In the present invention, the template region indicates a set of L line pixels (L=1~(N−1)) neighboring at least one of left, upper and upper-left vertexes of the current block or reference block having an N×N size or indicates a set of L line pixels (L=1~(N−1)) neighboring at least one of a left, right, upper side, lower side and four vertexes.

In the present invention, the uncorrelation factor is derived by the sum of absolute values of pixel value differences between the template of the current block and the template of the reference block. The uncorrelation factor includes an L0 uncorrelation factor for an L0 reference block and an L1 uncorrelation factor for an L1 reference block.

In the present invention, the first weight parameter of the current block is determined by an equation ((the L1 uncorrelation factor)/(the L0 uncorrelation factor+the L1 uncorrelation factor)).

In the present invention, the method further includes determining a $2^{nd}$ weight parameter of the current block as a ½ value and obtaining a second predictor using the $2^{nd}$ weight parameter and determining an optimal predictor of the current block based on a rate-distortion cost of the first predictor and the second predictor.

In the present invention, the method further includes signaling an adaptive weight index corresponding to each weight parameter. The first weight parameter and the second weight parameter are indicated by the adaptive weight index.

In the present invention, the second weight parameter is determined based on a predetermined weight table.

The present invention provides an apparatus for performing a bi-directional prediction on a current block using a template-based weight, including an inter prediction unit configured to determine a template region for performing the bi-directional prediction on the current block, calculate an uncorrelation factor based on the template region, determine a $1^{st}$ weight parameter of the current block based on the uncorrelation factor, and obtain a first predictor of the current block using the weight parameter; and a reconstruction unit configured to reconstruct the current block using the first predictor. The uncorrelation factor means a value indicating an uncorrelation between a template of the current block and a template of a reference block.

In the present invention, the inter prediction unit is configured to determine a $2^{nd}$ weight parameter of the current block as a ½ value and obtaining a second predictor using the $2^{nd}$ weight parameter and determine an optimal predictor of the current block based on a rate-distortion cost of the first predictor and the second predictor.

In the present invention, the apparatus further includes a parsing unit configured to extract, from a video signal, an adaptive weight index corresponding to each weight parameter. The first weight parameter and the second weight parameter are indicated by the adaptive weight index.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter is applied to a reconstructed picture, and thus can improve the precision of a prediction. For example, the inter prediction unit 180 may generate an interpolated pixel by applying the interpolation filter to an integer pixel, and may perform a prediction using an interpolated block configured with interpolated pixels as a prediction block.

In an embodiment of the present invention, the inter prediction unit 180 may determine an optimal prediction weight using a template.

Furthermore, the inter prediction unit 180 may obtain an optimal predictor using an adaptive weight parameter in a generalized bi-prediction.

Furthermore, the inter prediction unit 180 may obtain an optimal predictor by explicitly determining a weight index.

Furthermore, the inter prediction unit 180 may determine a template region using neighboring pixels of an L0 reference block, an L1 reference block and a current block.

Furthermore, the inter prediction unit 180 may determine an uncorrelation factor indicating an uncorrelation between an L0 reference block and a current block and an uncorrelation between an L1 reference block and the current block based on the template of the L0 reference block, the L1 reference block and the current block.

Furthermore, the inter prediction unit 180 may adaptively determine a weight parameter using an uncorrelation factor.

The intra prediction unit 185 may predict a current block with reference to samples peripheral to a block to be now encoded. The intra prediction unit 185 may perform the following process in order to perform intra prediction. First, the prediction unit may prepare a reference sample necessary to generate a prediction signal. Furthermore, the prediction unit may generate a prediction signal using the prepared reference sample. Thereafter, the prediction unit encodes a prediction mode. In this case, the reference sample may be prepared through reference sample padding and/or reference sample filtering. The reference sample may include a quantization error because a prediction and reconstruction process has been performed on the reference sample. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

Figure 2:
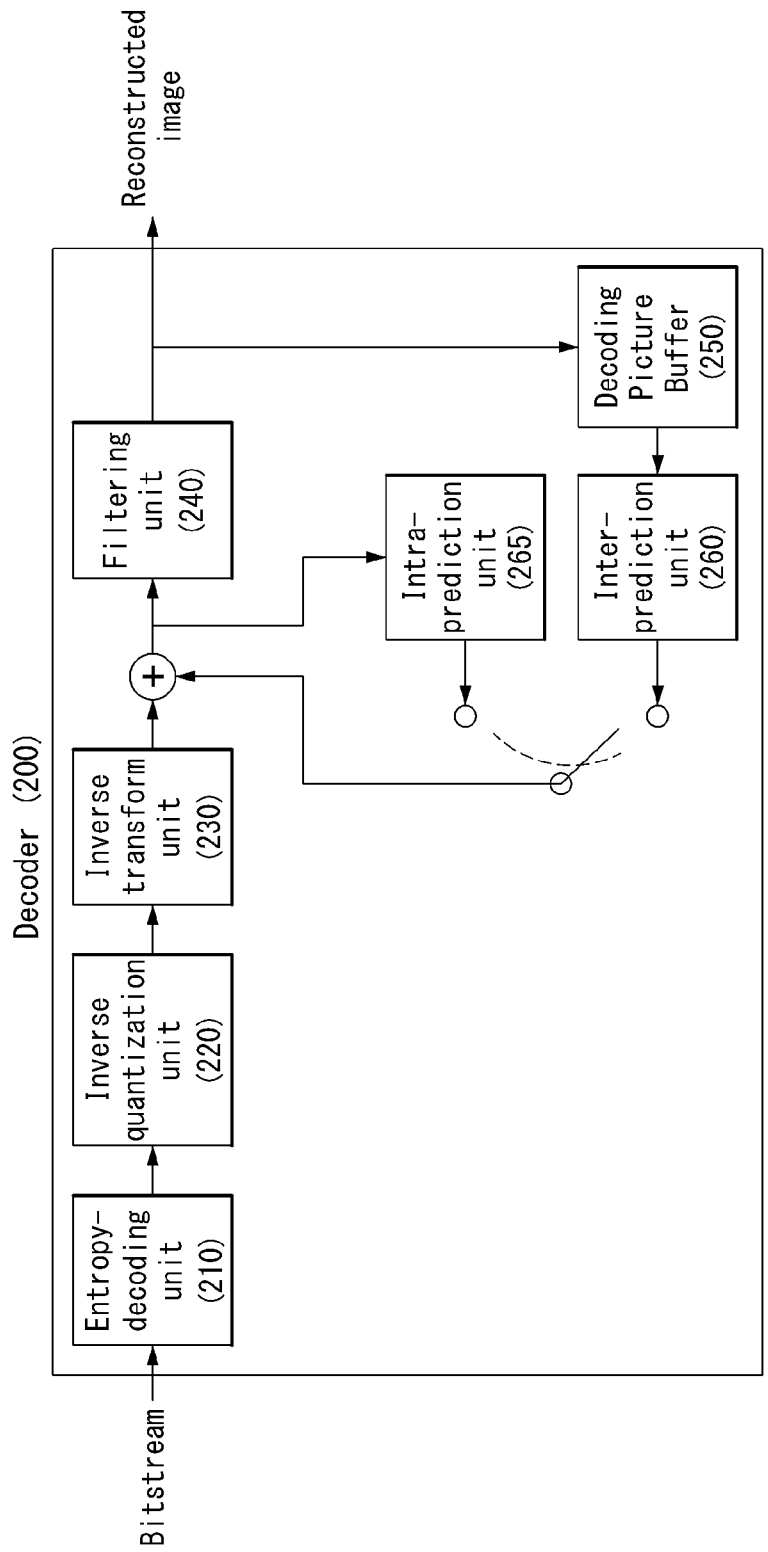
FIG. 2 is a block diagram illustrating a configuration of a decoder for decoding a video signal according to an embodiment of the present invention.

FIG. 2 is an embodiment to which the present invention is applied and shows a schematic block diagram of a decoder by which the decoding of a video signal is performed.

Referring to FIG. 2, the decoder 200 may be configured to include a parsing unit (not shown), an entropy decoding unit 210, a dequantization unit 220, an inverse transform unit 230, a filtering unit 240, a decoded picture buffer (DPB) unit 250, an inter prediction unit 260, an intra prediction unit 265 and a reconstruction unit (not shown).

For another example, the decoder 200 may be simply represented as including a parsing unit (not shown), a block split determination unit (not shown) and a decoding unit (not shown). In this case, embodiments to which the present invention is applied may be performed through the parsing unit (not shown), the block split determination unit (not shown) and the decoding unit (not shown).

The decoder 200 may receive a signal output by the encoder 100 of FIG. 1, and may parse or obtain a syntax element through the parsing unit (not shown). The parsed or obtained signal may be entropy-decoded through the entropy decoding unit 210.

The dequantization unit 220 obtains a transform coefficient from the entropy-decoded signal using quantization step size information.

The inverse transform unit 230 obtains a residual signal by inversely transforming the transform coefficient.

The reconstruction unit (not shown) generates a reconstructed signal by adding the obtained residual signal to a prediction signal output by the inter prediction unit 260 or the intra prediction unit 265.

The filtering unit 240 applies filtering to the reconstructed signal and transmits the filtered signal to a playback device or transmits the filtered signal to the decoded picture buffer unit 250. The filtered signal transmitted to the decoded picture buffer unit 250 may be used as a reference picture in the inter prediction unit 260.

In this specification, the embodiments described in the filtering unit 160, inter prediction unit 180 and intra prediction unit 185 of the encoder 100 may be identically applied to the filtering unit 240, inter prediction unit 260 and intra prediction unit 265 of the decoder, respectively.

In an embodiment of the present invention, the inter prediction unit 260 may determine an optimal prediction weight using a template.

Furthermore, the inter prediction unit 260 may obtain an optimal predictor using an adaptive weight parameter in a generalized bi-prediction.

Furthermore, the inter prediction unit 260 may obtain an optimal predictor using a weight index extracted from a video signal.

Furthermore, the inter prediction unit 260 may determine a template region based on neighboring pixels of an L0 reference block, an L1 reference block and a current block. Alternatively, the template region may have already been determined in the encoder and/or the decoder.

Furthermore, the inter prediction unit 260 may determine an uncorrelation factor indicating an uncorrelation between an L0 reference block and a current block and an uncorrelation between an L1 reference block and the current block based on the template of the L0 reference block, the L1 reference block and the current block.

Furthermore, the inter prediction unit 260 may adaptively determine a weight parameter using an uncorrelation factor.

A reconstructed video signal output through the decoder 200 may be played back through a playback device.

FIG. 3 is a diagram illustrating a split structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and I are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in a bit stream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which generates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU calculated in the process 2) with the sum of the rate-distortion values of the four 16×16 CUs calculated in the process 5). This process is performed on the remaining three 32×32 CUs in the same manner.

7) Finally, an optimum partition structure of a CU within a 64×64 block is determined by comparing the rate-distortion value of the 64×64 CU calculated in the process 1) with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

FIG. 5 is an embodiment to which the present invention is applied and is a diagram for illustrating a quadtree binarytree (hereinafter referred to as a "QTBT") block split structure.

Quad-Tree Binary-Tree (QTBT)

A QTBT refers to a structure of a coding block in which a quadtree structure and a binarytree structure have been combined. Specifically, in a QTBT block split structure, an image is coded in a CTU unit. A CTU is split in a quadtree form. A leaf node of a quadtree is additionally split in a binarytree form.

Hereinafter, a QTBT structure and a split flag syntax supporting the same are described with reference to FIG. 5.

Referring to FIG. 5, a current block may be split in a QTBT structure. That is, a CTU may be first hierarchically split in a quadtree form. Furthermore, a leaf node of the quadtree that is no longer spit in a quadtree form may be hierarchically split in a binarytree form.

The encoder may signal a split flag in order to determine whether to split a quadtree in a QTBT structure. In this case, the quadtree split may be adjusted (or limited) by a MinQTLumaISlice, MinQTChromaISlice or MinQTNonISlice value. In this case, MinQTLumaISlice indicates a minimum size of a quadtree leaf node of a luma component in an I-slice. MinQTLumaChromaISlice indicates a minimum size of a quadtree leaf node of a chroma component in an I-slice. MinQTNonISlice indicates a minimum size of a quadtree leaf node in a non-I-slice.

In the quadtree structure of a QTBT, a luma component and a chroma component may have independent split structures in an I-slice. For example, in the case of an I-slice in the QTBT structure, the split structures of a luma component and chroma component may be differently determined. In order to support such a split structure, MinQTLumaISlice and MinQTChromaISlice may have different values.

For another example, in a non-I-slice of a QTBT, the split structures of a luma component and chroma component in the quadtree structure may be identically determined. For example, in the case of a non-I-slice, the quadtree split structures of a luma component and chroma component may be adjusted by a MinQTNonISlice value.

In the QTBT structure, a leaf node of the quadtree may be split in a binarytree form. In this case, the binarytree split may be adjusted (or limited) by MaxBTDepth, MaxBTDepthISliceL and MaxBTDepthISliceC. In this case, MaxBTDepth indicates a maximum depth of the binarytree split based on a leaf node of the quadtree in a non-I-slice. MaxBTDepthISliceL indicates a maximum depth of the binarytree split of a luma component in an I-slice. MaxBTDepthISliceC indicates a maximum depth of the binarytree split of a chroma component in the I-slice.

Furthermore, in the I-slice of a QTBT, MaxBTDepthISliceL and MaxBTDepthISliceC may have different values in the I-slice because a luma component and a chroma component may have different structures.

In the case of the split structure of a QTBT, the quadtree structure and the binarytree structure may be used together. In this case, the following rule may be applied.

First, MaxBTSize is smaller than or equal to MaxQTSize. In this case, MaxBTSize indicates a maximum size of a binarytree split, and MaxQTSize indicates a maximum size of the quadtree split.

Second, a leaf node of a QT becomes the root of a BT.

Third, once a split into a BT is performed, it cannot be split into a QT again.

Fourth, a BT defines a vertical split and a horizontal split.

Fifth, MaxQTDepth, MaxBTDepth are previously defined. In this case, MaxQTDepth indicates a maximum depth of a quadtree split, and MaxBTDepth indicates a maximum depth of a binarytree split.

Sixth, MaxBTSize, MinQTSize may be different depending on a slice type.

Figure 6:
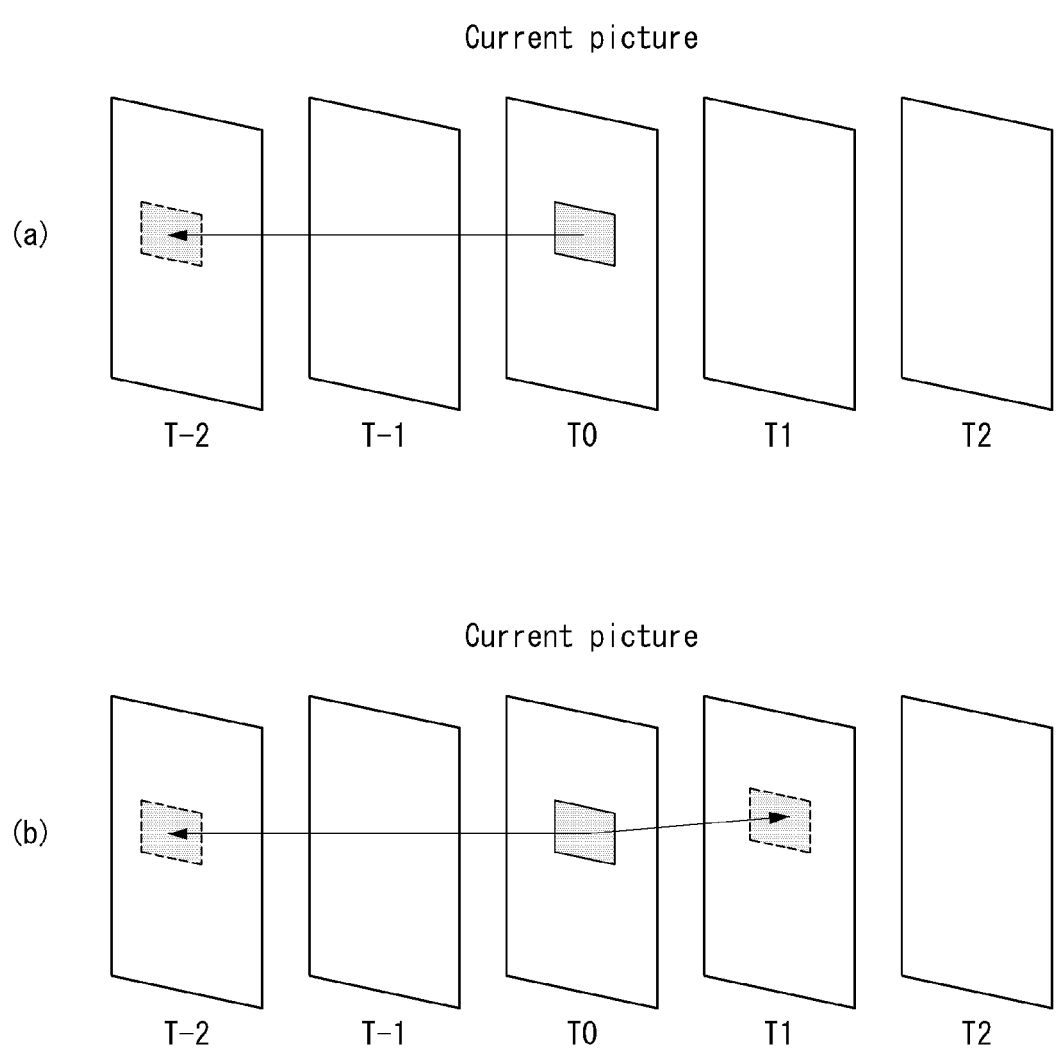
FIG. 6 is an embodiment to which the present invention is applied and is a diagram for illustrating a uni-directional inter prediction and a bi-directional inter prediction.

FIG. 6 is an embodiment to which the present invention is applied and is a diagram for illustrating a uni-directional inter prediction and a bi-directional inter prediction.

An inter prediction may be divided into a uni-directional prediction in which only one past picture or future picture is used as a reference picture on a time axis with respect to one block and a bi-directional prediction in which reference is made to the past and future pictures at the same time.

FIG. 6(a) shows a uni-directional prediction, and FIG. 6(b) shows a bi-directional prediction.

Referring to FIG. 6(a), it may be seen that a current picture is present in a T0 time and refers to a picture in a (T−2) time for inter prediction. Furthermore, referring to FIG. 6(b), it may be seen that a current picture is present in a T0 time and refers to two pictures, that is, a picture in a (T−2) time and a picture in a T1 time, for inter prediction.

Furthermore, uni-directional prediction may be divided into forward direction prediction using one reference picture displayed (or output) prior to a current picture temporally and backward direction prediction using one reference picture displayed (or output) after a current picture temporally.

In an inter prediction process (i.e., uni-directional or bi-directional prediction), a motion parameter (or information) used to specify that which reference region (or reference block) is used to predict a current block includes an inter prediction mode (in this case, the inter prediction mode may indicate a reference direction (i.e., uni-directional or bi-directional) and a reference list (i.e., L0, L1 or bi-direction)), a reference index (or reference picture index or reference list index), motion vector information. The motion vector information may include a motion vector, motion vector prediction (MVP) or a motion vector difference (MVD). The motion vector difference means a difference between a motion vector and a motion vector prediction.

In uni-directional prediction, a motion parameter for one-side direction is used. That is, one motion parameter may be necessary to specify a reference region (or reference block).

In a bi-directional prediction, a motion parameter for both-side directions is used. In a bi-directional prediction method, a maximum of two reference regions may be used. The two reference regions may be present in the same reference picture or may be present in different pictures, respectively. That is, in the bi-directional prediction method, a maximum of two motion parameters may be used. Two motion vectors may have the same reference picture index or may have different reference picture indices. In this case, both the reference pictures may be displayed (or output) prior to a current picture temporally or may be displayed (or output) after a current picture.

The encoder performs motion estimation for finding a reference region most similar to a current processing block from reference pictures in an inter prediction process. Furthermore, the encoder may provide the decoder with a motion parameter for the reference region.

The encoder or the decoder may obtain the reference region of the current processing block using the motion parameter. The reference region is present in a reference picture having the reference index. Furthermore, a pixel value or interpolated value of the reference region specified by a motion vector may be used as the predictor of the current processing block. That is, motion compensation for predicting an image of the current processing block from a previously decoded picture using motion information is performed.

In order to reduce the amount of transmission related to motion vector information, a method of obtaining a motion vector prediction (mvp) using motion information of previously coded blocks and transmitting only a difference (mvd) therefor may be used. That is, the decoder obtains a motion vector prediction of a current processing block using motion information of decoded other blocks and obtains a motion vector value for the current processing block using a difference transmitted by the encoder. In obtaining the motion vector prediction, the decoder may obtain various motion vector candidate values using motion information of already decoded other blocks, and may obtain one of the motion vector candidate values as a motion vector prediction.

Figure 7:
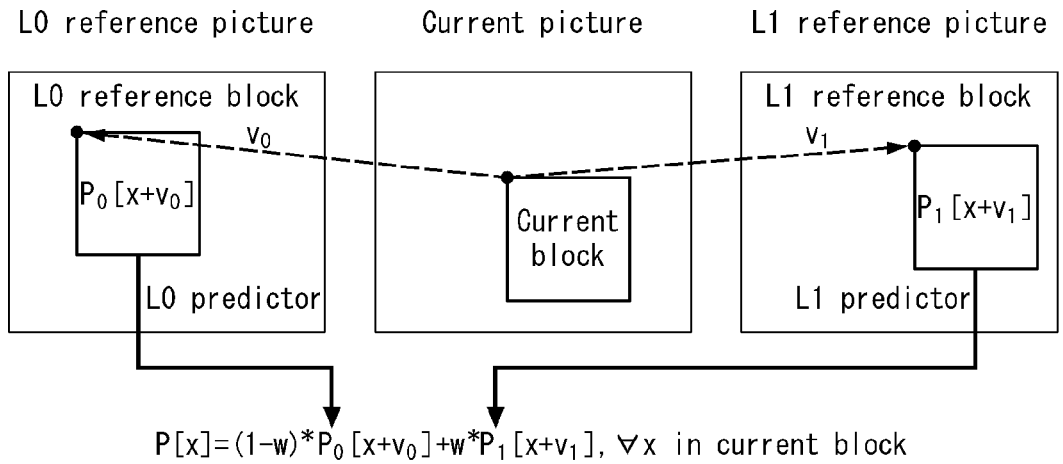
FIG. 7 is an embodiment to which the present invention is applied and is a diagram for illustrating a generalized bi-prediction method.

FIG. 7 is an embodiment to which the present invention is applied and is a diagram for illustrating a generalized bi-prediction method.

Generalized Bi-Prediction

The present invention provides a generalized bi-prediction method for obtaining a bi-directional predictor in inter coding.

Referring to FIG. 7, it is assumed that an L0 reference picture and an L1 reference picture are present with reference to a current picture. In this case, assuming that a predictor obtained from an L0 reference block is an L0 predictor and a predictor obtained from an L1 reference block is an L1 predictor, the present invention may obtain an optimal predictor by adaptively applying a weight to the L0 predictor and the L1 predictor.

In an embodiment, as in Equation 1, a bi-directional predictor may be obtained using an adaptive weight.

$$P[x]=(1-w)*P_0[x+v0]+w*P_1[x+v1] \quad \text{[Equation 1]}$$

In this case, P[x] means a predictor at the x location of a current block. $P_i[x+vi], \forall i \in \{0,1\}$ means a motion-compensated prediction block obtained using a motion vector (MV) $v_i$ in a reference picture $L_i$. (1−w) and w mean weight values. In this case, a set W of the weight values may be configured as an embodiment like Equations 2 to 4.

$$w=\{3/8, 1/2, 5/8\} \quad \text{[Equation 2]}$$

$$w=\{1/4, 3/8, 1/2, 5/8, 3/4\} \quad \text{[Equation 3]}$$

$$w=\{-1/4, 1/4, 3/8, 1/2, 5/8, 3/4, 5/4\} \quad \text{[Equation 4]}$$

Bit allocations for the weight values of Equations 2 to 4 are the same as Tables 1 to 3, respectively.

Tables 1 to 3 show index binarization schemes for the weight values of Equations 2 to 4, respectively.

TABLE 1

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | 3/8 | 00 | 00 |
| 1 | 1/2 | 1 | 01 |
| 2 | 5/8 | 01 | 1 |

TABLE 2

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | 1/4 | 0000 | 0000 |
| 1 | 3/8 | 001 | 0001 |
| 2 | 1/2 | 1 | 01 |
| 3 | 5/8 | 01 | 1 |
| 4 | 3/4 | 0001 | 001 |

TABLE 3

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | +311/4 | 000000 | 000000 |
| 1 | 1/4 | 00001 | 000001 |
| 2 | 3/8 | 001 | 0001 |
| 3 | 1/2 | 1 | 01 |
| 4 | 5/8 | 01 | 1 |
| 5 | 3/4 | 0001 | 001 |
| 6 | 5/4 | 000001 | 00001 |

In Tables 1 to 3, mvd_l1_zero_flag is determined in a slice header. When mvd_l1_zero_flag=1, an MVD value of L0 is determined as 0 and only an MVD value of L1 is transmitted. When mvd_l1_zero_flag=0, the MVD values of L0 and L1 are transmitted.

Figure 8:
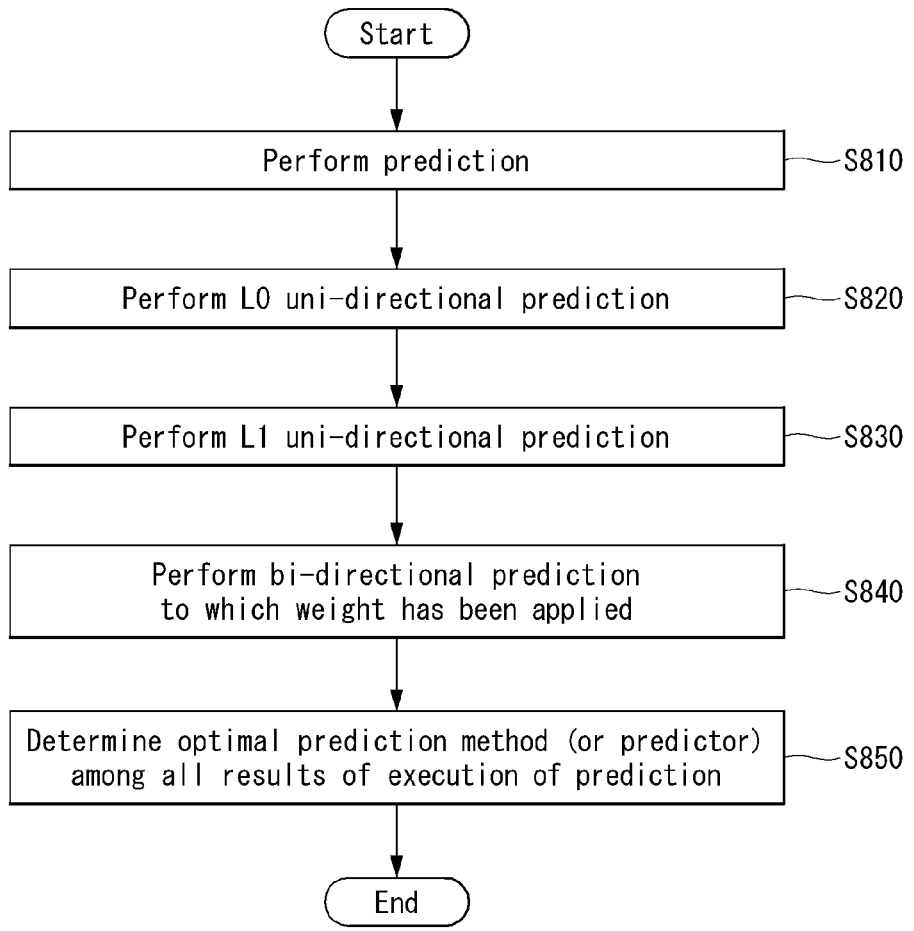
FIG. 8 is an embodiment to which the present invention is applied and is a flowchart for illustrating a process of determining an optimal prediction method.

FIG. 8 is an embodiment to which the present invention is applied and is a flowchart for illustrating a process of determining an optimal prediction method.

The present embodiment is described on the basis of the encoder, for convenience of description, but the present invention is not limited thereto and may be performed by the decoder within the range performed by the decoder.

The encoder may perform a prediction according to a skip mode or a merge mode (S810).

The encoder may perform uni-directional prediction in an L0 direction (S820) or may perform uni-directional prediction in an L1 direction (S830).

Furthermore, the encoder may perform a bi-directional prediction to which a weight has been applied (S840). In this case, a weight determination method or a bi-directional prediction method described in this specification may be applied to the bi-directional prediction to which a weight has been applied.

Steps S810 to S840 are not limited to their sequence. The encoder may perform at least one of a skip mode, a merge mode, an L0 uni-directional prediction, an L1 uni-directional prediction or a bi-directional prediction to which a weight has been applied.

The encoder may determine an optimal predictor among predictors calculated by the above-described prediction methods (S850). In this case, the optimal predictor may mean a value that minimizes a difference between a pixel value of a current block and the predictor or may mean a value that minimizes a rate-distortion (RD) cost.

Hereinafter, a weight determination method in order to obtain an optimal predictor and a method of performing a bi-directional prediction to which a weight has been applied are described.

Figure 9:
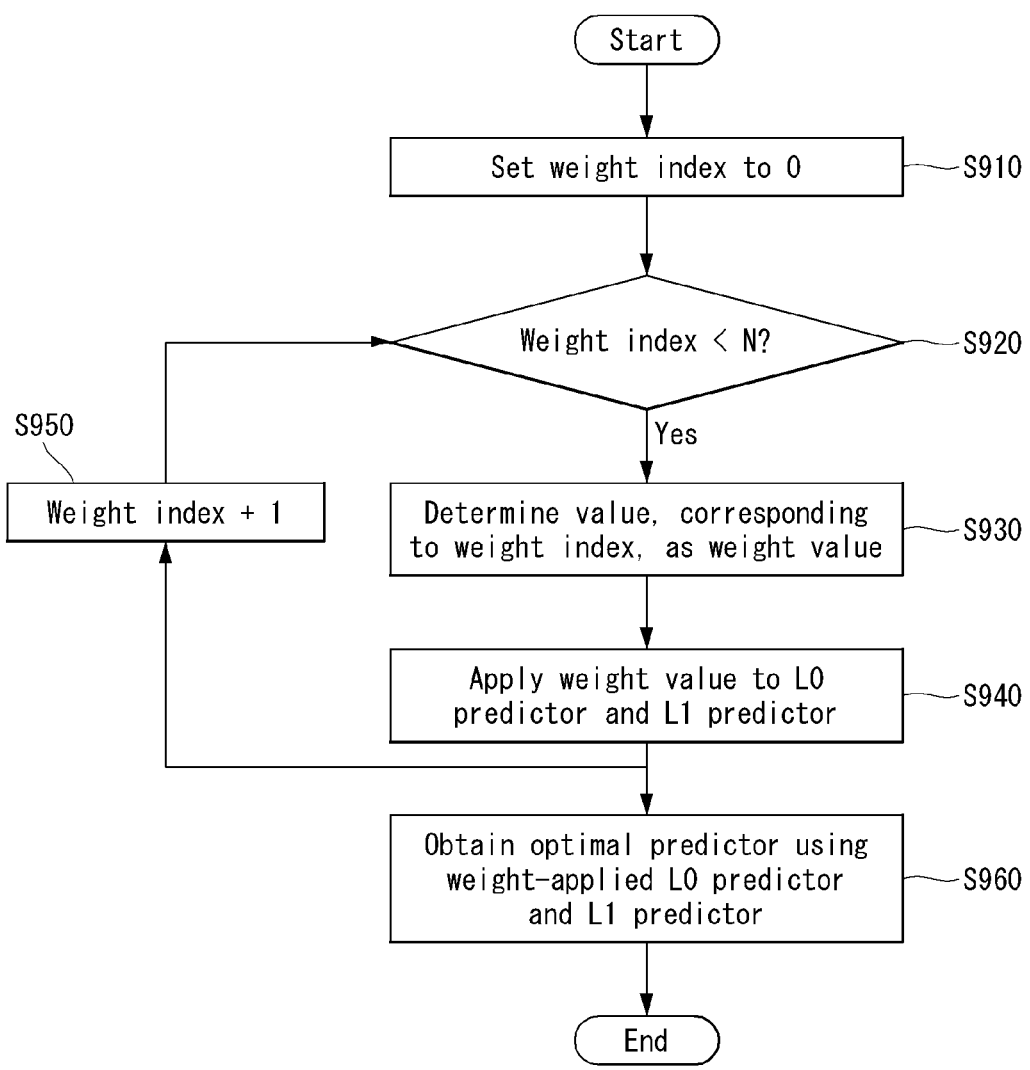
FIG. 9 is an embodiment to which the present invention is applied and is a flowchart for illustrating a process of performing an optimal bi-directional prediction using a weight index.

FIG. 9 is an embodiment to which the present invention is applied and is a flowchart for illustrating a process of performing an optimal bi-directional prediction using a weight index.

As described in FIG. 8, the encoder may perform at least one of a skip mode, a merge mode, an L0 uni-directional prediction, an L1 uni-directional prediction or a bi-directional prediction to which a weight has been applied, and may determine an optimal predictor among them.

In this case, in the case of the bi-directional prediction to which a weight has been applied, the weight may be determined based on any one of Tables 1 to 3. For example, in the case of Table 3, the weight index may be set to 0 to 6. In this case, the weight may mean a value corresponding to the weight index.

An embodiment of the present invention provides a method of obtaining an optimal predictor based on a bi-directional prediction to which a weight has been applied.

Referring to FIG. 9, the encoder may first set a weight index to 0 (S910).

The encoder may check whether the weight index is smaller than N (S920). For example, if the weight indices of Table 3 are used, the N value may be 7.

When the weight index is smaller than 7, the encoder may determine a value, corresponding to the weight index, as a weight value (S930).

Furthermore, the encoder may apply the weight value to an L0 predictor and an L1 predictor (S940). In this case, Equation 1 may be used.

The encoder adds 1 to the weight value and may perform steps S920 to S940 again.

The encoder may obtain an optimal predictor among predictors obtained through the loop process (S960). In this case, the optimal predictor may be calculated based on a weight-applied L0 predictor and L1 predictor. The finally determined weight value may mean a value that minimizes a difference between a pixel value of the current block and the predictor or may mean a value that minimizes a rate-distortion (RD) cost. Furthermore, a weight index corresponding to the finally determined weight value may mean an optimal weight index.

Furthermore, if the weight indices of Table 3 are used, the encoder may repeatedly perform steps S920 to S950 while a weight index has the value of 0~6.

The present invention is not limited thereto. If the weight indices of Table 1 and Table 2 are used, the same method may be applied.

FIG. 10 is an embodiment to which the present invention is applied and shows a syntax structure in which an optimal bi-directional prediction is performed using a weight index.

An embodiment of the present invention provides a method of performing a bi-directional prediction using a weight index, and provides a method of defining a weight index in the decoder.

First, the decoder may confirm which prediction method is used with respect to a current prediction unit. For example, any one of an L0 uni-directional prediction, an L1 uni-directional prediction or a bi-directional prediction may be used as a prediction method.

Referring to FIG. 10, the decoder may confirm whether a bi-directional prediction is performed (S1010). For example, the decoder may confirm whether a bi-directional prediction is performed through if(inter_pred_idc[x0][y0]==PRED_BI). In this case, inter_pred_idc may mean whether an L0 uni-directional prediction, an L1 uni-directional prediction or a bi-directional prediction is used for a current prediction unit. PRED_BI may mean a bi-directional prediction.

If a bi-directional prediction is performed according to step S1010, the decoder may extract a weight index (S1020). In this case, the weight index may be represented as gbi_idx [x0][y0]. For example, the weight index may be defined according to the embodiments of Tables 1 to 3.

When the weight index is extracted, the decoder may derive a weight value corresponding to the weight index.

The decoder may obtain a bi-directional predictor by applying the weight value to an L0 predictor and an L1 predictor. In this case, Equation 1 may be used.

The decoder may reconstruct a current block using the bi-directional predictor.

Meanwhile, as in Tables 1 to 3, in order to determine (or derive) a weight value (or weight parameter), a corresponding weight index needs to be transmitted. In order to transmit the weight index, an additional bit needs to be used. For example, as in Table 3, when mvd_l1_zero_flag is 0, bits necessary to represent a weight index is 1 bit in the case of w=½, 2 bits in the case of w=⅝, 3 bits in the case of w=⅜, 4 bits in the case of w=¾, 5 bits in the case of w=¼, and 6 bits in the case of w=−¼ or 5/4.

Furthermore, if encoding is performed and optimal weight values are determined with respect to all weight values, coding complexity may be very great.

Furthermore, an optimal weight value can be calculated more precisely because the limited number of 3 weight values (or weight parameters) are used in the case of Table 1, the limited number of 5 weight values (or weight parameters) are used in the case of Table 2, and the limited number of 7 weight values (or weight parameters) are used in the case of Table 3. However, the above example has a problem in that a finer weight value, such as 1/16, 2/16, cannot be used. In summary, a bi-directional prediction using a weight table based on a weight index may have the following problems. For example, additional bits are necessary, encoder complexity increases, and the limited number of weight parameters is used.

Accordingly, another embodiment of the present invention proposes a weight determination method value based on a template in order to solve the problems.

In the present embodiment, an optimal weight value may be determined using small bits without using an additional bit. Furthermore, when compared with a bi-directional prediction using a weight table based on a weight index, encoder complexity is low because only a combination of smaller bit cases is taken into consideration. Furthermore, in the present invention, a weight value (or weight parameter) is not limited because the weight value is determined based on a template. Accordingly, more accurate expression is possible.

This is described below more specifically.

Figure 11:
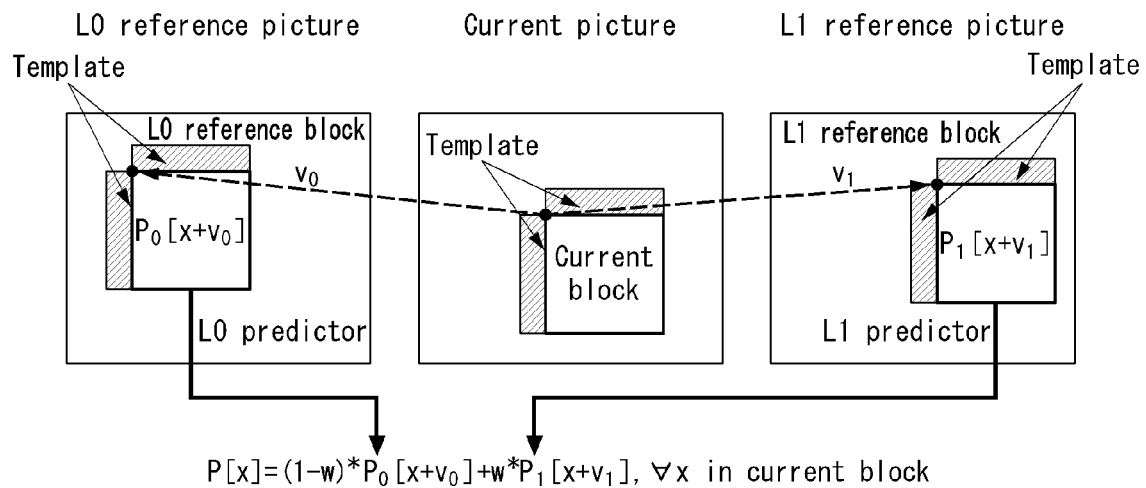
FIG. 11 is an embodiment to which the present invention is applied and is a diagram for illustrating a method of performing an adaptive bi-directional prediction using a template.

FIG. 11 is an embodiment to which the present invention is applied and is a diagram for illustrating a method of performing an adaptive bi-directional prediction using a template.

Adaptive Bi-Directional Prediction

The present invention provides a method of determining an optimal weight value using a template in inter coding and adaptively performing a bi-directional prediction using the optimal weight value. In this specification, a weight determined (or obtained) using a template may be called a template-based weight.

Referring to FIG. 11, it is assumed that an L0 reference picture and an L1 reference picture are present on the basis of a current picture. In this case, assuming that a predictor obtained from an L0 reference block is an L0 predictor and a predictor obtained from an L1 reference block is an L1 predictor, the present invention may obtain an optimal predictor by adaptively applying a weight to the L0 predictor and the L1 predictor.

In this case, the present invention may use a template (or template region) in order to determine a weight value (or weight parameter).

Furthermore, the present invention may use a template in order to search for an optimal L0/L1 predictor or to search for an optimal L0/L1 reference block.

In this case, the template may mean a set of pixels having a pre-defined form, and this may have already been determined in the encoder or the decoder. However, the present invention is not limited thereto. The template may be adaptively determined based on at least one of the characteristics (common parameter, prediction method, size, form, etc.) of a sequence, picture, slice, block, a coding unit or prediction unit.

For example, referring to FIG. 11, the template may mean a set of L line pixels (L=1~(N−1)) neighboring at least one of the left, upper and upper-left vertexes of a current block (N×N). In this specification, the template has been described based on a block, but the present invention is not limited thereto as described above.

As a detailed example, the template may determine or calculate uncorrelation factors (ucL0, ucL1) based on a pixel value difference at the same location between the template of an L0/L1 reference block and the template of a current block (or the sum of absolute values of the pixel value differences). In this case, the uncorrelation factor may mean a value indicating an uncorrelation (or correlation) between a reference block and a current block. Alternatively, the uncorrelation factor may mean a value indicating an uncorrelation (or correlation) between the template of a reference block and the template of a current block.

When the uncorrelation factors are determined, the encoder or the decoder may determine a weight value using the factors, and may perform a bi-directional prediction based on the weight value.

In an embodiment, as in Equation 5, a bi-directional predictor may be obtained using a weight value w.

$$P[x]=(1-w)*P_0[x+v0]+w*P_1[x+v1] \quad \text{[Equation 5]}$$

In this case, P[x] means a predictor at the x location of a current block. $P_i[x+vi]$, $\forall i \in \{0,1\}$ means a motion-compensated prediction block obtained using a motion vector (MV) $v_i$ in a reference picture $L_i$. (1−w) and w mean weight values. In this case, the weight value w may be determined based on the uncorrelation factors. This is described more specifically in an embodiment below.

Figure 12:
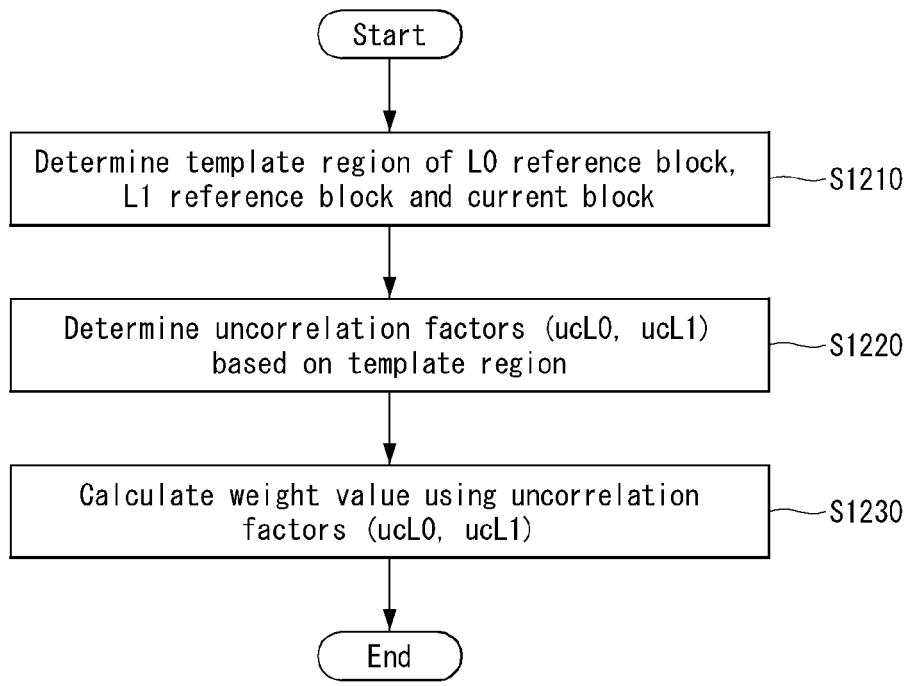
FIG. 12 is an embodiment to which the present invention is applied and is a flowchart for illustrating a process of performing an adaptive bi-directional prediction using a template.

FIG. 12 is an embodiment to which the present invention is applied and is a flowchart for illustrating a process of performing an adaptive bi-directional prediction using a template.

The encoder or the decoder may determine the template or template region of at least one of an L0 reference block, an L1 reference block and a current block (S1210). In this case, the template may mean a set of pixels having a pre-defined form, and this may have already been determined in the encoder or the decoder. For example, the template may mean a set of L line pixels (L=1~(N−1)) neighboring at least one of the left, upper and upper-left vertexes of a current block (N×N) or a reference block (N×N). However, the present invention is not limited thereto, the template may be adaptively determined based on at least one of the characteristics (common parameter, prediction method, size, form, etc.) of a sequence, picture, slice, block, coding unit or prediction unit.

The encoder or the decoder may determine uncorrelation factors (ucL0, ucL1) based on the template region (S1220). In this case, the uncorrelation factors may include an L0 uncorrelation factor (ucL0) for the L0 reference block and an L1 uncorrelation factor (ucL1) for the L1 reference block.

The encoder or the decoder may calculate or determine a weight value using the uncorrelation factors (ucL0, ucL1) (S1230).

Figure 13:
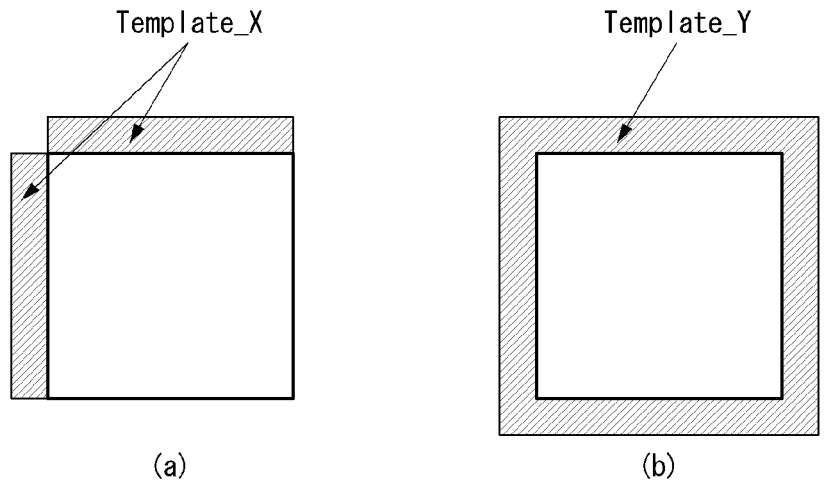
FIG. 13 is an embodiment to which the present invention is applied and is a diagram illustrating a method of determining a template region in order to perform an adaptive bi-directional prediction.

FIG. 13 is an embodiment to which the present invention is applied and is a diagram illustrating a method of determining a template region in order to perform an adaptive bi-directional prediction.

Method of Determining Template Region

The present invention provides various methods of determining a template or template region as in step S1210 of FIG. 12.

First, referring to FIG. 13(a), a template Template_X may mean a set of L line pixels (L=1~(N−1)) neighboring at least one of the left, upper and upper-left vertexes of a block (N×N).

For another example, referring to FIG. 13(b), a template Template_Y may mean a set of L line pixels (L=1~(N−1)) neighboring at least one of the left, right, upper side and lower side and four vertexes of a block (N×N). That is, the template Template_Y may be configured with pixels of a form surrounding the block. In this case, a pixel value neighboring the right or lower side (may include vertex value) of the block may be determined by a pixel value neighboring at least one of the left or upper side (may include vertex value) of the block, but the present invention is not limited thereto.

In the present invention, the above two cases have been taken as an example, but the present invention is not limited thereto. For example, a template may be configured with pixels neighboring at least one of the left, right, upper side and lower side or four vertexes of a block (N×N).

Figure 14:
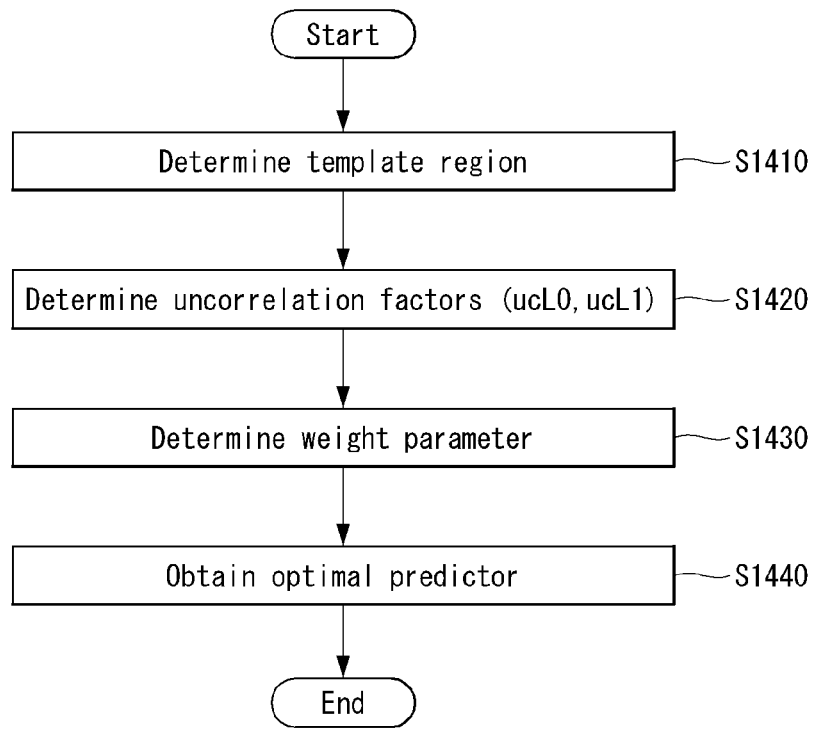
FIG. 14 is an embodiment to which the present invention is applied and is a flowchart for illustrating a process of performing an adaptive bi-directional prediction based on a template without using a weight index.

FIG. 14 is an embodiment to which the present invention is applied and is a flowchart for illustrating a process of performing an adaptive bi-directional prediction based on a template without using a weight index.

Method of Determining Uncorrelation Factors

The present invention provides a method of determining uncorrelation factors based on a template region.

In an embodiment, the uncorrelation factors may be determined or calculated by Equation 6 and Equation 7.

$$ucL0 = \sum_{i \in R} f(c_i, p0_i) \quad \text{[Equation 6]}$$

$$ucL1 = \sum_{i \in R} f(p1_i, c_i) \quad \text{[Equation 7]}$$

In this case, ucL0 indicates an L0 uncorrelation factor indicating an uncorrelation between an L0 reference block and a current block. ucL1 indicates an L1 uncorrelation factor indicating an uncorrelation between an L1 reference block and a current block.

R indicates a template region. $p0_i$ indicates a pixel value of an L0 template region. $p1_i$ indicates a pixel value of an L0 template region. $c_i$ indicates a pixel value of a current template. Furthermore, $f(x,y)=abs(x-y)$.

Furthermore, the present invention is not limited thereto, and the uncorrelation factors may be substituted according to various methods for obtaining a correlation or uncorrelation.

Method of Determining Weight Parameter

The present invention provides a weight determination method parameter using uncorrelation factors. In this specification, a weight parameter and a weight value may be interchangeably used.

In an embodiment, a weight parameter w may be determined or calculated by Equation 8.

$$w = \frac{ucL1}{ucL0 + ucL1} \quad \text{[Equation 8]}$$

The present invention provides an adaptive bi-directional prediction method, which may be performed as follows.

The encoder or the decoder may determine a template region (S1410). In this case, the embodiments described in this specification may be applied to the template region.

The encoder or the decoder may determine uncorrelation factors based on the template region (S1420). In this case, the embodiments described in this specification may be applied to the uncorrelation factors.

The encoder or the decoder may determine a weight parameter using the uncorrelation factors (S1430). In this case, the embodiments described in this specification may be applied to the weight parameter.

The encoder or the decoder may obtain a bi-directional predictor using the weight parameter (S1440).

The present invention can obtain an optimal predictor without transmitting a separate index indicating a weight parameter by deriving a weight parameter based on at least one of a template region or uncorrelation factors as described above.

Meanwhile, particularly, a real value must be able to be represented by left shift operation of 2 because encoding and decoding need to be implemented to be easily designed in terms of hardware. Accordingly, Equation 8 may be defined like Equation 9 and Equation 10.

$$t = \frac{ucL1}{ucL0 + ucL1} \quad \text{[Equation 9]}$$

$$w = \frac{\text{round}(\text{step} * t)}{\text{step}} \quad \text{[Equation 10]}$$

In this case, t is a given real value between 0~1. Assuming that step=4, t has one value of w=(0, ¼, 2/4, ¾, 1). The step is a given number and may be 4, 8, 16, 32, 64, for example.

Figure 15:
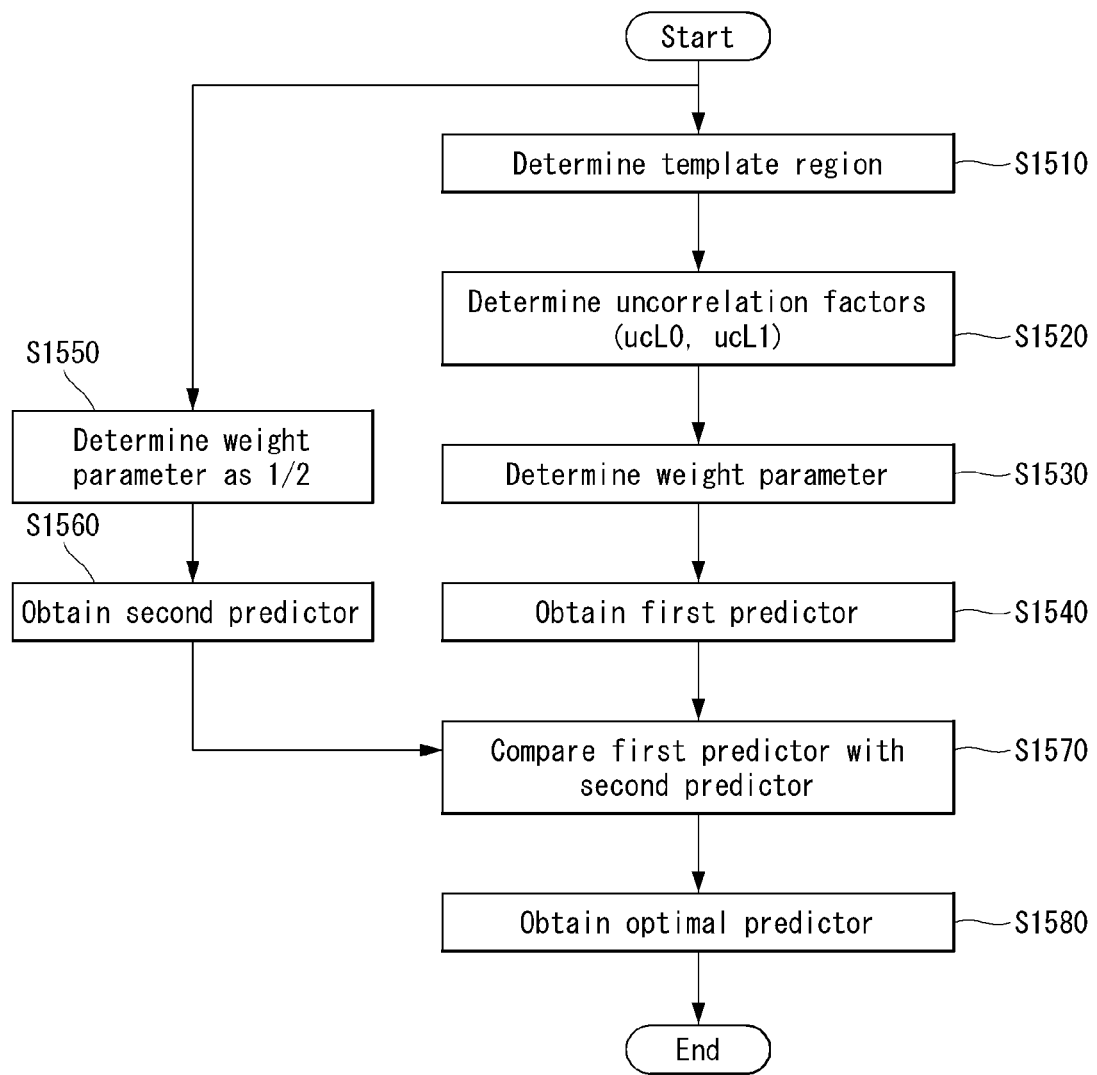
FIG. 15 is an embodiment to which the present invention is applied and is a flowchart for illustrating a process of performing an optimal bi-directional prediction based on a method of determining two or more weights.

FIG. 15 is an embodiment to which the present invention is applied and is a flowchart for illustrating a process of performing an optimal bi-directional prediction based on a method of determining two or more weights.

The present invention provides a method of performing an optimal bi-directional prediction based on a method of determining two or more weights. In this case, if a weight determination method is different, a weight parameter may be divided into a first weight parameter and a second weight parameter and a predictor may be divided into a first predictor and a second predictor, for distinction between terms. The present invention is not limited thereto. If the same term is used, a first term and a second term may be separately used, which may also be applied to other terms.

The encoder or the decoder may determine a template region (S1510). In this case, the embodiments described in this specification may be applied to the template region.

The encoder or the decoder may determine uncorrelation factors based on the template region (S1520). In this case, the embodiments described in this specification may be applied to the uncorrelation factors.

The encoder or the decoder may determine a weight parameter using the uncorrelation factors (S1530). In this case, the embodiments described in this specification may be applied to the weight parameter.

The encoder or the decoder may obtain a first predictor using the weight parameter (S1540).

Meanwhile, the encoder or the decoder may determine the weight parameter using various methods. For example, the encoder or the decoder may determine the weight parameter as ½, that is, a predetermined value (S1550).

For another example, as described in FIGS. 7 to 10, the weight parameter may be determined based on a weight index. For example, a value corresponding to the weight index may be derived from a predetermined weight table.

The encoder or the decoder may obtain a second predictor based on the weight parameter determined in step S1550 (S1560).

The encoder or the decoder may compare the first predictor with the second predictor (S1570), and may obtain an optimal predictor (S1580).

In another embodiment of the present invention, the encoder may assign a separate index (hereinafter referred to as an "adaptive weight index") regarding whether to perform steps S1510 to S1540 or perform steps S1550 to S1560, and may explicitly transmit the index.

For example, adaptive weight indices may be defined using Table 4 below.

TABLE 4

| Index | Weight | Binarization |
|---|---|---|
| 0 | ½ | 0 |
| 1 | w | 1 |

In this case, when an adaptive weight index is 0, a weight parameter means ½. When an adaptive weight index is 1, a weight parameter means w. In this case, the above-described methods may be applied to a method of determining the w value.

The encoder may perform encoding with respect to the case of all adaptive weight indices, and may determine an optimal weight parameter based on a result of the execution. Furthermore, a corresponding adaptive weight index is signaled and transmitted to the decoder.

The syntax structure of FIG. 10 may be identically used for a method of signaling the adaptive weight index.

Another embodiment of the present invention provides various methods of defining an adaptive weight index.

For example, an adaptive weight index may be defined using Table 5 or Table 6.

Referring to Table 5, when an adaptive weight index is 0, a weight parameter means ½ and is represented as a binarization bit 0. When an adaptive weight index is 1, a weight parameter means w and is represented as a binarization bit 10. When an adaptive weight index is 2, a weight parameter means w' and is represented as a binarization bit 11. In this case, w' may be determined as the closest value among values smaller than w or a value closer to w among values greater than w.

TABLE 5

| Index | Weight | Binarization |
|---|---|---|
| 0 | ½ | 0 |
| 1 | w | 10 |
| 2 | w' | 11 |

TABLE 6

| Index | Weight | Binarization |
|---|---|---|
| 0 | w | 0 |
| 1 | ½ | 10 |
| 2 | w' | 11 |
| ... | ... | ... |
| n − 1 | | |

Likewise, referring to Table 6, when an adaptive weight index is 0, a weight parameter means w and is represented as a binarization bit 0. When an adaptive weight index is 1, a weight parameter means ½ and is represented as a binarization bit 10. When an adaptive weight index is 2, a weight parameter means w' and is represented as a binarization bit 11. In this case, w' may be determined as the closest value among values smaller than w or a value closer to w among values greater than w.

The present invention may explicitly use n weight parameters by adding a new weight parameter as in Table 6.

As described above, the embodiments described in the present invention may be implemented and executed on a processor, microprocessor, controller or chip. For example, the function units shown in FIGS. 1 and 2 may be implemented and executed on a computer, processor, microprocessor, controller or chip Furthermore, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus, and may be used to process video signals and data signals Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing a bi-directional prediction using a template-based weight by an apparatus, the method comprising:
   determining a template region for performing the bi-directional prediction on a current block,
   wherein the template region indicates a set of one or more L line pixels defined as pixels on L number of line (L=1, ... , N−1, where N is a width or a height of the current block or reference block.) neighboring at least one of left, upper and upper-left vertexes of the current block or the reference block or indicates a set of one or more L line pixels defined as pixels on L number of line (L=1, ... , N−1, where N is the width or the height of the current block or the reference block.) neighboring at least one of a left, right, upper side, lower side and four vertexes of the current block or the reference block;
   calculating an uncorrelation factor based on the template region, wherein the uncorrelation factor means a value indicating an uncorrelation between a template of the current block and a template of a reference block,
   wherein the uncorrelation factor is derived by a sum of absolute values of pixel value differences between the template of the current block and the template of the reference block;
   determining a first weight parameter of the current block based on the uncorrelation factor; and obtaining a first predictor of the current block using the weight parameter.

2. The method of claim 1, wherein the uncorrelation factor includes an L0 uncorrelation factor for an L0 reference block and an L1 uncorrelation factor for an L1 reference block.

3. The method of claim 1, wherein the first weight parameter of the current block is determined by an equation ((the L1 uncorrelation factor)/(the L0 uncorrelation factor+ the L1 uncorrelation factor)).

4. The method of claim 1, further comprising: determining a second 2' weight parameter of the current block as a ½ value and obtaining a second predictor using the second 2 weight parameter; and determining an optimal predictor of the current block based on a rate-distortion cost of the first predictor and the second predictor.

5. The method of claim 4, further comprising: signaling an adaptive weight index corresponding to each weight parameter, wherein the first weight parameter and the second weight parameter are indicated by the adaptive weight index.

6. The method of claim 4, wherein the second weight parameter is determined based on a predetermined weight table.

7. An apparatus for performing a bi-directional prediction on a current block using a template-based weight, the apparatus comprising:

a processor configured to determine a template region for performing the bi-directional prediction on a current block, wherein the template region indicates a set of one or more L line pixels defined as pixels on L number of line (L=1, . . . , N−1, where N is a width or a height of the current block or reference block.) neighboring at least one of left, upper and upper-left vertexes of the current block or the reference block or indicates a set of one or more L line pixels defined as pixels on L number of line (L=1, . . . , N−1, where N is the width or the height of the current block or the reference block.) neighboring at least one of a left, right, upper side, lower side and four vertexes of the current block or the reference block, calculate an uncorrelation factor based on the template region, determine a first weight parameter of the current block based on the uncorrelation factor, and obtain a first predictor of the current block using the weight parameter, wherein the uncorrelation factor is derived by a sum of absolute values of pixel value differences between the template of the current block and the template of the reference block; and reconstruct the current block using the first predictor, wherein the uncorrelation factor means a value indicating an uncorrelation between a template of the current block and a template of a reference block; and a memory configured to store information instructing to perform an operation of the processor.

8. The apparatus of claim 7, wherein the uncorrelation factor includes an L0 uncorrelation factor for an L0 reference block and an L1 uncorrelation factor for an L1 reference block.

9. The apparatus of claim 7, wherein a first weight parameter of the current block is determined by an equation ((the L1 uncorrelation factor)/(the L0 uncorrelation factor+ the Li uncorrelation factor)).

10. The apparatus of claim 7, wherein the processor is configured to: determine a second 2' weight parameter of the current block as a ½ value and obtaining a second predictor using the second 2' weight parameter, and determine an optimal predictor of the current block based on a rate-distortion cost of the first predictor and the second predictor.

11. The apparatus of claim 10, further comprising: the processor configured to extract, from a video signal, an adaptive weight index corresponding to each weight parameter, wherein the first weight parameter and the second weight parameter are indicated by the adaptive weight index.

12. The apparatus of claim 10, wherein the second weight parameter is determined based on a predetermined weight table.

* * * * *